(12) United States Patent
Shimizu et al.

(10) Patent No.: US 11,167,509 B2
(45) Date of Patent: Nov. 9, 2021

(54) COMPOSITE-MATERIAL MOLDING APPARATUS AND COMPOSITE-MATERIAL MOLDING METHOD

(71) Applicant: MITSUBISHI HEAVY INDUSTRIES, LTD., Tokyo (JP)

(72) Inventors: Takayuki Shimizu, Tokyo (JP); Toshio Abe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 764 days.

(21) Appl. No.: 16/065,335

(22) PCT Filed: Jan. 11, 2017

(86) PCT No.: PCT/JP2017/000550
§ 371 (c)(1),
(2) Date: Jun. 22, 2018

(87) PCT Pub. No.: WO2017/134988
PCT Pub. Date: Aug. 10, 2017

(65) Prior Publication Data
US 2021/0206126 A1     Jul. 8, 2021

(30) Foreign Application Priority Data

Feb. 2, 2016   (JP) .............................. JP2016-018017

(51) Int. Cl.
*B29C 70/54*   (2006.01)
*B29C 33/02*   (2006.01)
(Continued)

(52) U.S. Cl.
CPC ............. *B29C 70/54* (2013.01); *B29C 33/02* (2013.01); *B29C 35/0288* (2013.01); *G01K 11/32* (2013.01)

(58) Field of Classification Search
CPC .............. G01K 11/32; G01K 11/3206; G01K 11/3213; G01K 11/322; G01K 11/324; B29C 70/54; B29C 33/02
See application file for complete search history.

(56) References Cited

U.S. PATENT DOCUMENTS 3,822,598 A * 7/1974 Brothers .................. G01K 7/42
374/169
5,391,860 A * 2/1995 Massano ................. B29C 45/78
219/494

(Continued)

FOREIGN PATENT DOCUMENTS

| CN | 201042833 | | 4/2008 |
| CN | 103009510 A | * | 4/2013 |

(Continued)

OTHER PUBLICATIONS

Office Action dated Sep. 3, 2019 in corresponding Chinese Patent Application No. 201780006108.3, with English translation.

(Continued)

*Primary Examiner* — Atul P. Khare
(74) *Attorney, Agent, or Firm* — Wenderoth, Lind & Ponack, L.L.P.

(57) ABSTRACT

A composite-material molding apparatus for molding a composite material, wherein the molding apparatus is provided with: a main body; a composite-material layer in which a molding face for molding a composite material is formed, the composite-material layer coating the surface of the main body; a filamentous fiber-optic temperature sensor embedded in the composite-material layer; a heating unit provided inside the main body; and a control device for controlling the heating unit on the basis of the temperature measured by the fiber-optic temperature sensor; the fiber- (Continued)

optic temperature sensor being disposed in planar fashion in a plane parallel to the molding face.

8 Claims, 6 Drawing Sheets

(51) Int. Cl.
  G01K 11/32 (2021.01)
  B29C 35/02 (2006.01)
  G02B 6/02 (2006.01)

(56) References Cited

U.S. PATENT DOCUMENTS

| | | | |
|---|---|---|---|
| 5,770,155 A | 6/1998 | Dunphy et al. | |
| 7,333,696 B2 * | 2/2008 | Kojima | G01K 11/32 385/100 |
| 8,211,339 B2 * | 7/2012 | Inston | B29C 70/44 264/40.6 |
| 8,290,315 B2 * | 10/2012 | Saunders | G01K 11/3206 385/12 |
| 9,533,453 B2 * | 1/2017 | Zuardy | B29C 70/546 |
| 10,399,253 B2 * | 9/2019 | Xie | B29C 70/54 |

FOREIGN PATENT DOCUMENTS

| | | | |
|---|---|---|---|
| JP | 2000-501176 | 2/2000 | |
| JP | 2004-082644 | 3/2004 | |
| JP | 2008-185456 | 8/2008 | |
| JP | 2012-131080 | 7/2012 | |
| WO | 97/19325 | 5/1997 | |
| WO | WO-2005083379 A1 * | 9/2005 | G01L 1/24 |
| WO | 2008/096167 | 8/2008 | |
| WO | WO-2009144341 A1 * | 12/2009 | G01K 11/3206 |
| WO | 2012086471 | 6/2012 | |
| WO | WO-2015058911 A1 * | 4/2015 | B22D 11/059 |

OTHER PUBLICATIONS

Extended European Search Report dated Jan. 23, 2019 in European Patent Application No. 17747151.3.
Written Opinion of the International Searching Authority dated Feb. 21, 2017 in International (PCT) Application No. PCT/JP2017/000550.
International Search Report dated Feb. 21, 2017 in International (PCT) Application No. PCT/JP2017/000550.

* cited by examiner

COMPOSITE-MATERIAL MOLDING APPARATUS AND COMPOSITE-MATERIAL MOLDING METHOD

TECHNICAL FIELD

The present invention relates to a composite-material molding apparatus and a composite-material molding method for molding a composite material.

BACKGROUND ART

In the related art, an intelligent molding system of a thermosetting resin composite-material which regulates an ambient temperature in an autoclave accommodating a thermosetting resin composite-material therein is known (for example, refer to PTL 1). The intelligent molding system is equipped with a first temperature measuring instrument which measures the ambient temperature in the autoclave and a second temperature measuring instrument which measures a target temperature of the thermosetting resin composite-material. The first temperature measuring instrument and the second temperature measuring instrument use an optical fiber strain sensor and the second temperature measuring instrument measures a temperature of a surface of the composite material or a temperature of a specific position inside the composite material.

CITATION LIST

Patent Literature

[PTL 1] Japanese Unexamined Patent Application Publication No. 2004-82644

SUMMARY OF INVENTION

Technical Problem

However, in PTL 1, the optical fiber strain sensor is embedded in the composite material, and thus, strength of the composite material after the composite material is cured may decrease. Accordingly, it is not desirable when the cured composite material is used as a part which requires strength.

Accordingly, an object of the present invention is to provide a composite-material molding apparatus and a composite-material molding method capable of obtaining an appropriately molded composite material without decreasing strength of the composite material.

Solution to Problem

According to the present invention, there is provided a composite-material molding apparatus for molding a composite material, including: a main body portion; a surface layer which covers a surface of the main body portion and on which a molding surface for molding the composite material is formed; and a filamentous optical fiber temperature sensor which is embedded in the surface layer, in which the optical fiber temperature sensor is disposed in a planar manner in a plane parallel to the molding surface.

According to this configuration, it is possible to measure a temperature of the composite material installed on the molding surface by the optical fiber temperature sensor without embedding the optical fiber temperature sensor inside the composite material. Accordingly, whether or not the composite material reaches a target molding temperature which is a target temperature can be evaluated based on the measurement temperature measured by the optical fiber temperature sensor. Therefore, it is possible to measure the temperature of the composite material without decreasing strength of the composite material, and thus, it is possible to appropriately evaluate the composite material and it is possible to obtain the composite material which is appropriately molded.

In addition, preferably, the composite-material molding apparatus further includes a heating unit which is provided inside the main body portion, and a control device which controls the heating unit based on a temperature measured by the optical fiber temperature sensor.

According to this configuration, the heating unit is controlled by the control device, and thus, the molding surface can be set to a temperature which is appropriate for molding the composite material. Accordingly, it is possible to suppress occurrence of defects caused by a failure to reach an appropriate molding temperature of the composite material, and it is possible to improve productivity of the composite material.

Moreover, preferably, the heating unit is able to heat each of a plurality of heating regions set on the molding surface, and the control device controls a heating amount generated by the heating unit in the plurality of heating regions.

According to this configuration, temperatures of the plurality of heating regions set on the molding surface can be controlled, and thus, it is possible to control the temperature of the molding surface in detail, and a detailed temperature suitable for molding the composite material can be set. Therefore, it is possible to suppress occurrence of defects caused by the failure to reach the appropriate molding temperature of the composite material, and it is possible to further improve productivity of the composite material.

In addition, preferably, the control device stores a correlation between an actual temperature of the composite material and a measurement temperature measured by the optical fiber temperature sensor, a thermal response of the measurement temperature with respect to the heating amount of the heating unit, and a target molding temperature of the composite material in advance, and the control device calculates the actual temperature of the composite material from the correlation based on the measurement temperature measured by the optical fiber temperature sensor, calculates a temperature difference between the calculated actual temperature of the composite material and the target molding temperature of the composite material stored in advance, and controls the heating unit based on the thermal response such that the temperature difference decreases.

According to this configuration, based on the correlation, the thermal response, and the target molding temperature, it is possible to control the heating unit by the control device such that the actual temperature of the composite material becomes the target molding temperature.

Moreover, preferably, a portion of the optical fiber temperature sensor is provided at a position which reaches the highest temperature in the molding surface, and the other portion of the optical fiber temperature sensor is provided at a position which reaches the lowest temperature in the molding surface.

According to this configuration, it is possible to measure the highest temperature and the lowest temperature in the molding surface by the optical fiber temperature sensor, and thus, it is possible to estimate a temperature distribution between the highest temperature and the lowest temperature, and it is possible to estimate a temperature distribution of the entire molding surface.

In addition, preferably, the surface layer is a composite-material layer which is formed of a fiber reinforced composite-material.

According to this configuration, the surface layer is the composite-material layer, and thus, it is possible to decrease a weight of the molding apparatus, it is possible to decrease a heat capacity of the molding apparatus, and thus, it is possible to effectively heat the composite material.

In addition, preferably, the main body portion includes a carbon foam.

According to this configuration, the main body portion includes a carbon foam, and thus, it is possible to decrease the weight of the molding apparatus, it is possible to decrease the heat capacity of the molding apparatus, and it is possible to effectively heat the composite material.

According to the present invention, there is provided a composite-material molding method of molding a composite material, including: a measurement temperature acquisition step of acquiring a measurement temperature measured by an optical fiber temperature sensor embedded in a surface layer on which a molding surface for molding the composite material is formed; an actual temperature acquisition step of acquiring an actual temperature of the composite material based on a correlation between the actual temperature of the composite material and the measurement temperature measured by the optical fiber temperature sensor; a target molding temperature acquisition step of acquiring a target molding temperature of the composite material; a difference calculation step of calculating a temperature difference between the target molding temperature and the actual temperature; and a heating control step of controlling a heating amount to the composite material such that the temperature difference decreases.

According to this configuration, the heating amount to the composite material can be controlled such that the actual temperature of the composite material becomes the target molding temperature. Accordingly, the molding surface can be set to the temperature which is appropriate for molding the composite material. Accordingly, it is possible to suppress occurrence of defects caused by the failure to reach the appropriate molding temperature of the composite material, and it is possible to improve the productivity of the composite material.

DESCRIPTION OF EMBODIMENTS

Hereinafter, embodiments according to the present invention will be described in detail with reference to the drawings. In addition, the present invention is not limited by the embodiments. In addition, constituent elements in the following embodiments include constituent elements which can be easily replaced by a person skilled in the art, or constituent elements which are substantially the same as each other. Moreover, the constituent elements described below can be appropriately combined, and in a case where there are a plurality of embodiments, it is possible to combine the embodiments.

Embodiment 1

A composite-material molding apparatus 1 according to Embodiment 1 is an apparatus for molding a composite material which is a fiber reinforced plastic in which a fiber is impregnated with a thermosetting resin. For example, the composite material is used a part constituting the aircraft fuselage or the like, and as a part, for example, a tail of the fuselage is applied. In addition, for example, for a composite material, a Carbon Fiber Reinforced Plastic (CFRP) is used, and the composite material is molded by laminating prepregs in which carbon fibers are impregnated with the thermosetting resin is laminated so as to form a laminate and curing the laminate.

Figure 1:
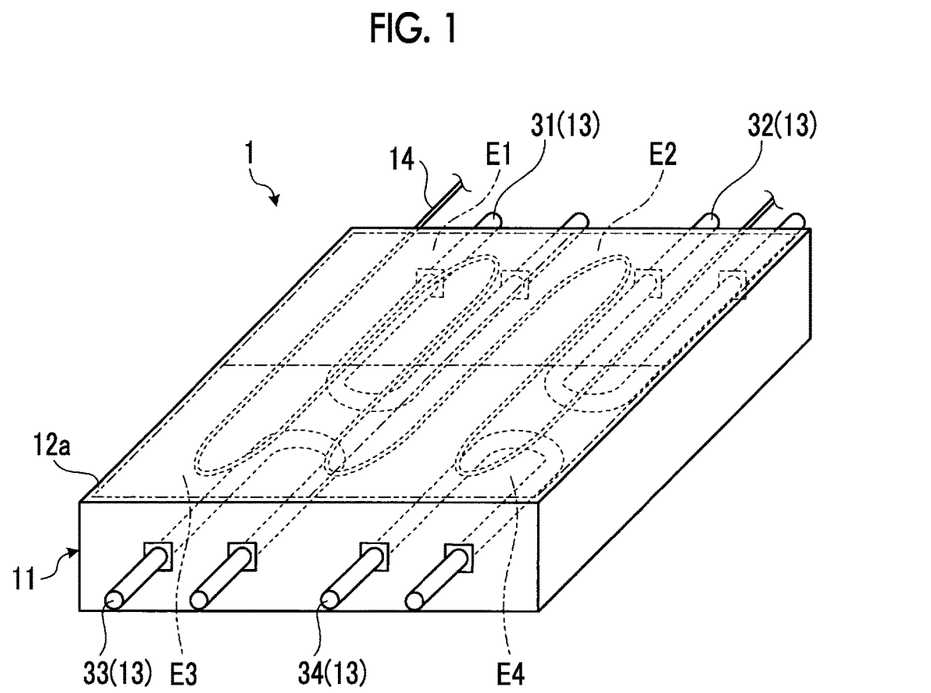
FIG. 1 is a perspective view schematically showing a composite-material molding apparatus according to Embodiment 1.
Figure 2:
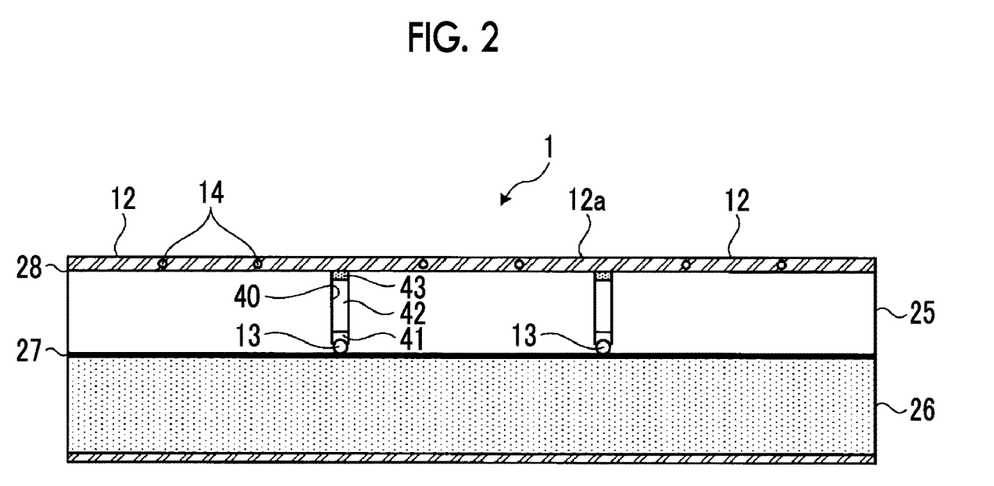
FIG. 2 is a sectional view schematically showing the composite-material molding apparatus according to Embodiment 1.
Figure 3:
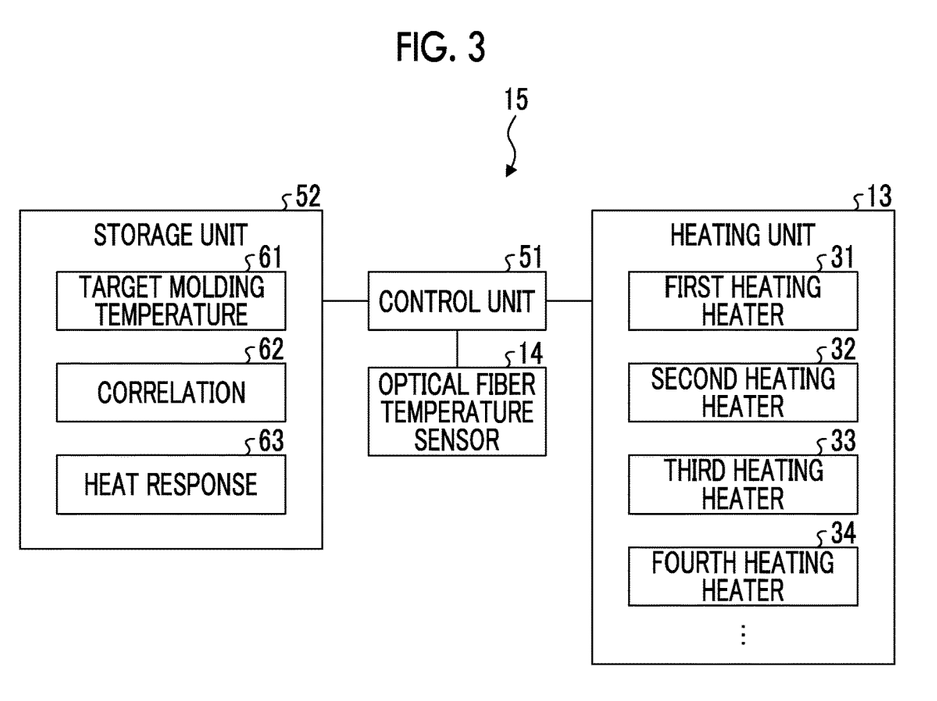
FIG. 3 is a block diagram showing a control device of the composite-material molding apparatus according to Embodiment 1.
Figure 4:
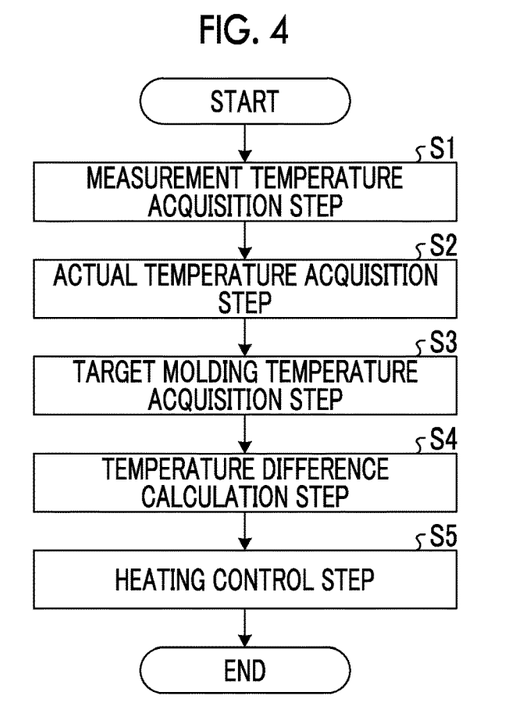
FIG. 4 is a flowchart relating to a composite-material molding method according to Embodiment 1.

FIG. 1 is a perspective view schematically showing the composite-material molding apparatus according to Embodiment 1. FIG. 2 is a sectional view schematically showing the composite-material molding apparatus according to Embodiment 1. FIG. 3 is a block diagram showing a control device of the composite-material molding apparatus according to Embodiment 1. FIG. 4 is a flowchart relating to a composite-material molding method according to Embodiment 1.

The molding apparatus 1 can be accommodated in an autoclave where the temperature and the pressure of the inside thereof become a high temperature and a high pressure. As shown in FIGS. 1 and 2, the molding apparatus 1 includes a main body portion 11, a composite-material layer 12, a heating unit 13, an optical fiber temperature sensor 14, and a control device 15.

The main body portion 11 is formed by adhering two or more carbon foams having different thermal conductivities. The carbon foam is lightweight and is heat resistant. Specifically, the main body portion 11 includes a front surface-side carbon foam 25 which has a high thermal conductivity provided on a front surface side and a rear surface-side carbon foam 26 which has a thermal conductivity lower than that of the front surface-side carbon foam 25 and is provided on a rear surface side. In addition, the main body portion 11 includes an adhesive layer 27 which is provided between the front surface-side carbon foam 25 and the rear surface-side carbon foam 26.

The composite-material layer 12 is adhered to the front surface side of the main body portion 11 via an adhesive layer 28 and becomes a surface layer of the molding apparatus 1. The composite-material layer 12 is formed using the CFRP, and a heat-resistant temperature of the CFRP is higher than that of the composite material to be molded. The composite-material layer 12 covers the surface of the main body portion 11 and the surface becomes a molding surface 12a which molds the composite material. The molding surface 12a has a shape which follows a shape of the composite material to be molded. A plurality of heating regions E1 to E4 are set on the molding surface 12a. In addition, for example, in Embodiment 1, in order to simplify the explanation, a case where the four heating regions E1 to E4 are set on the molding surface 12a is described. The four heating regions E1 to E4 are regions obtained by dividing the molding surface 12a into four crosses, and include the first heating region E1, the second heating region E2, the third heating region E3, and the fourth heating region E4.

The heating unit 13 is provided inside the main body portion 11, and can heat each of the plurality of heating regions E1 to E4 set on the molding surface 12a. According to the four heating regions E1 to E4, the heating unit 13 includes a first heating heater 31, a second heating heater 32, a third heating heater 33, and a fourth heating heater 34. That is, the first heating heater 31 heats the composite material in the first heating region E1 of the molding surface 12a, and similarly, the second to fourth heating heaters 32 to 34 heat the composite material in the second to fourth heating regions E2 to E4 of the molding surface 12a. The heating unit 13 is connected to the control device 15 and heating of the heating unit 13 is controlled by the control device 15.

The first heating heater 31 to the fourth heating heater 34 of the heating unit 13 are fitted in a groove 40 formed in the front surface-side carbon foam 25 of the main body portion 11, and are fixed by applying a heat transfer cement 41 to each of the heating heaters 31 to 34. Moreover, a carbon foam member 42 which is the same material as that of the front surface-side carbon foam 25 is fitted in the front surface side of the heat transfer cement 41 in the groove 40. A portion between the front surface side of the carbon foam member 42 and the front surface-side carbon foam 25 is filled with an adhesive agent 43.

The optical fiber temperature sensor 14 is embedded inside the composite-material layer 12. The optical fiber temperature sensor 14 is formed in a linear shape which is long in a longitudinal direction and can measure a temperature at a predetermined position in the longitudinal direction. The filamentous optical fiber temperature sensor 14 is arranged in a planar manner (two-dimensionally) in a plane parallel to the molding surface 12a. Specifically, the filamentous optical fiber temperature sensor 14 is disposed in a meandering manner in the molding surface 12a. The disposition of the optical fiber temperature sensor 14 is not particularly limited and may be a spiral disposition or a lattice disposition as long as it is arranged in a planar manner. The optical fiber temperature sensor 14 disposed in a planar manner measures the temperature at a predetermined position of the molding surface 12a in which the optical fiber temperature sensor 14 exists. Therefore, the control device 15 can acquire a measurement temperature at a predetermined position of the molding surface 12a. Moreover, a thickness of the composite-material layer 12 is approximately 4 mm to 5 mm, and the optical fiber temperature sensor 14 is disposed at a depth of approximately 1 mm to 2 mm from the molding surface 12a of the composite-material layer 12. Moreover, it is desirable that the position of the optical fiber temperature sensor 14 installed in on the molding surface 12a is immediately above the heating heaters 31 to 34 and centered between heating heaters 31 to 34.

The control device 15 includes a control unit 51 and a storage unit 52, and the heating unit 13 and the optical fiber temperature sensor 14 are connected to the control device 15.

The storage unit 52 stores data 61 relating to a target molding temperature which is a molding temperature of the target composite material, data 62 relating to the correlation between an actual temperature of the composite material and the measurement temperature of the optical fiber temperature sensor 14, and data 63 relating to a thermal response to the molding surface 12a with respect to the heating amount of the heating unit 13. The data 61 relating to the target molding temperature is data which relates to a molding temperature suitable for the composite material to be molded. In addition, the target molding temperature is set for each of the plurality of heating regions E1 to E4. The data 62 relating to the correlation is obtained by an experiment or the like performed in advance, and according to the data 62 relating to the correlation, it is possible to acquire the actual temperature of the composite material based on the measurement temperature. The data 63 relating to thermal response is obtained by an experiment or the like performed in advance, and according to the data 63 relating to thermal response, it is possible to acquire the thermal response to the molding surface 12a, that is, a heat input amount from the heating unit 13 to the composite material, based on the heating amount of the heating unit 13. In other words, according to the data 63 relating to thermal response, it is possible to acquire the heating amount of the heating unit 13 based on the heat input amount to the composite material.

The control unit 51 controls the heating unit 13 such that a temperature difference between the target molding temperature of the composite material and the actual temperature of the composite material decreases. When the control unit 51 controls the heating unit 13, the control unit 51 calculates the actual temperature of the composite material from the data 62 relating to correlation stored in the storage unit 52, based on the measurement temperature measured by the optical fiber temperature sensor 14. In addition, the control unit 51 calculates the temperature difference between the calculated actual temperature of the composite material and the target molding temperature stored in the storage unit 52. In this case, the temperature difference is calculated for each of the plurality of heating regions E1 to E4. Moreover, the control unit 51 calculates the heating amount of each of the heating heaters 31 to 34 of the heating unit 13 from the data 63 relating to thermal response stored in the storage unit 52, based on the heat input amount to the composite material.

Figure 6:
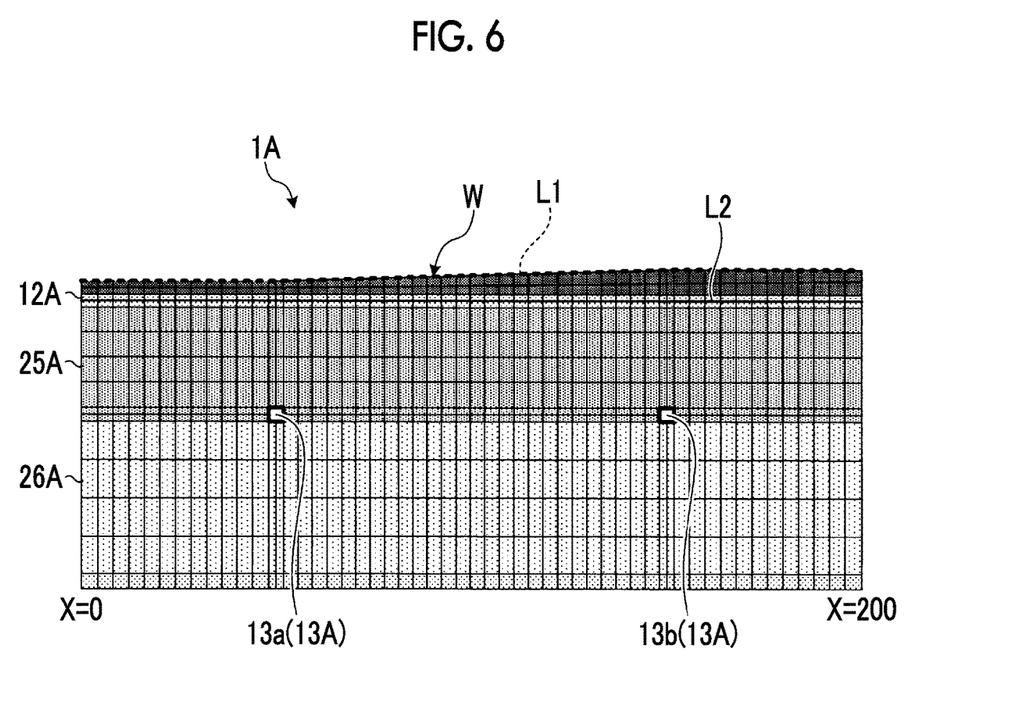
FIG. 6 is an explanatory diagram relating to an analysis model of the molding apparatus and a composite material.

Next, with reference to FIGS. 6 to 12, the control of the heating unit 13 based on the measurement temperature of the optical fiber temperature sensor 14 will be described according to an analysis result. FIG. 6 is an explanatory diagram relating to an analysis model of the molding apparatus and the composite material. As shown in FIG. 6, an analysis model 1A is obtained by modeling the molding apparatus 1 by a finite element method, and portions in the analysis model corresponding to the composite-material layer 12, the front surface-side carbon foam 25, the rear surface-side carbon foam 26, and the heating unit 13 are referred to as a composite-material layer 12A, a front surface-side carbon foam 25A, a rear surface-side carbon foam 26A, and a heating unit 13A. A part W which is the composite material is installed on the molding surface 12a of the composite-material layer 12A of the analysis model 1A. In addition, the control of the heating unit 13A described below, the control unit 51 is controlled such that the target molding temperatures (temperature distributions) of the heating regions E1 to E4 of the part W are uniform.

The part W has the analysis model in which a thickness of the part W increases from one position (X=0) in a horizontal direction in the molding surface 12a toward another position (X=200). Here, the heating unit on the left side of FIG. 6 in the heating unit 13A is referred to as a heating heater 13a, and the heating unit on the right side of FIG. 6 is referred to as a heating heater 13b.

Here, L1 (dotted line) of FIG. 6 is a line from the one position (X=0) to another position (X=200) on the surface of the part W in the horizontal direction, and a temperature is acquired along the line L1. In addition, L2 (solid line) of FIG. 6 is a line from one position (X=0) to another position (X=200) inside the composite-material layer 12A in the horizontal direction, and a temperature is acquired along the line L2.

Figure 7:
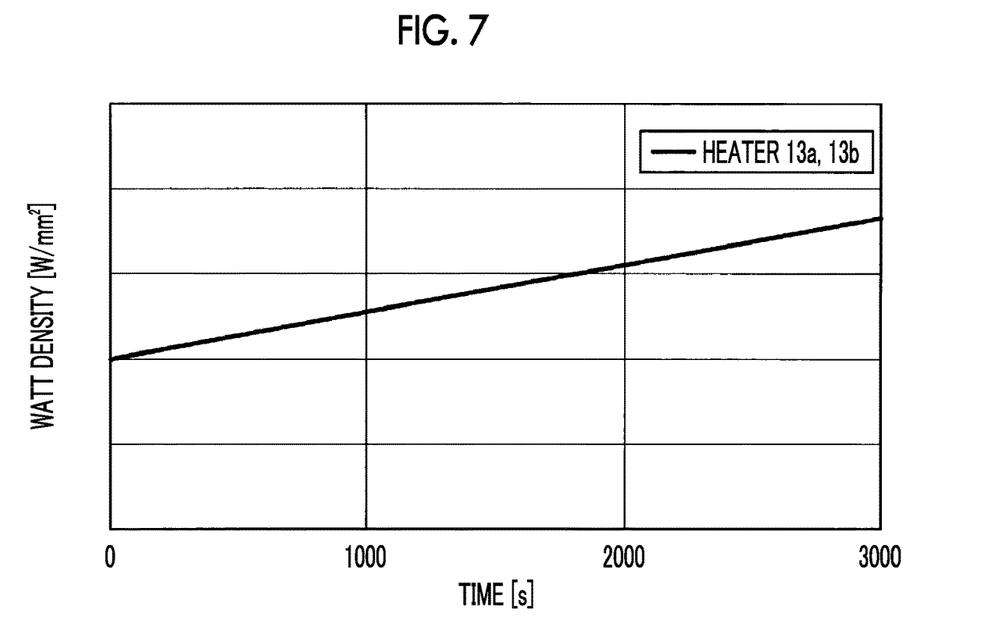
FIG. 7 is a graph of an example relating to a heating amount history of a heating heater.
Figure 8:
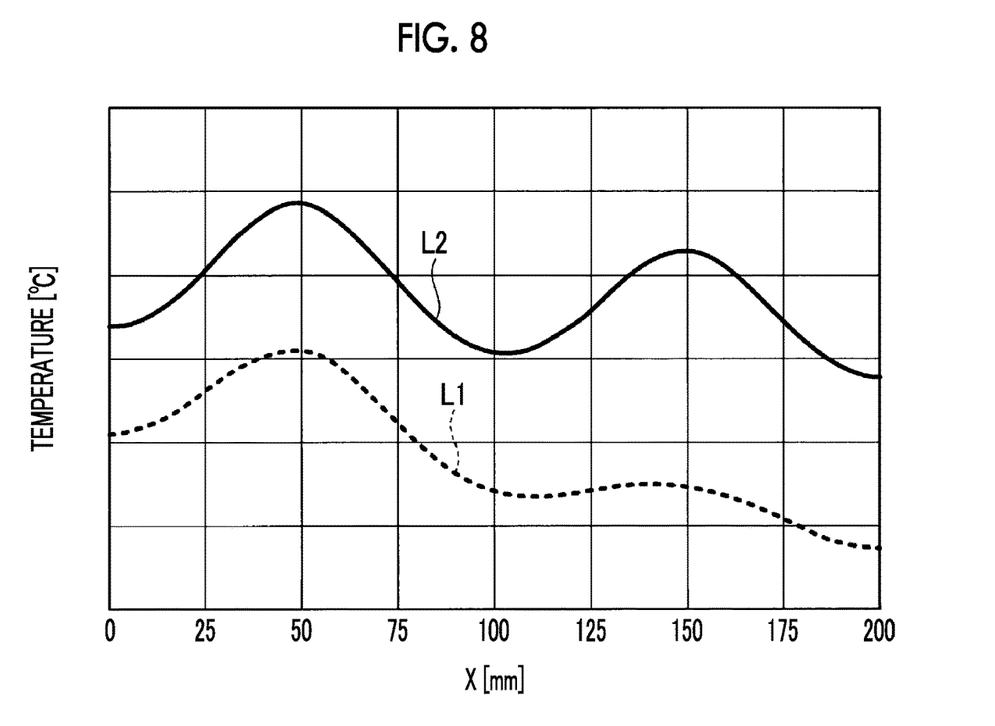
FIG. 8 is a graph relating to an example of temperature changes of the molding apparatus and the composite material.

FIG. 7 is a graph of an example relating to a heating amount history of the heating heater, and FIG. 8 is a graph relating to an example of temperature changes of the molding apparatus and the composite material. As shown in FIG. 7, in a case where the control device 15 does not control the heating unit 13A and the heating amount (watt density) which increases at a fixed rate from a start time (0 s) to a predetermined time (3000 s) is applied to the heating heaters 13a and 13b on the left side and the right side, the temperature of the line L1 and the temperature of the line L2 are changed as shown in FIG. 8. In addition, FIG. 8 shows the line L1 and the line L2 at the predetermined time (3000 s). As shown in FIG. 8, in the line L1, the temperature difference between a portion where the thickness of the part W is thin and a portion where the thickness of the part W is thick is large.

Figure 9:
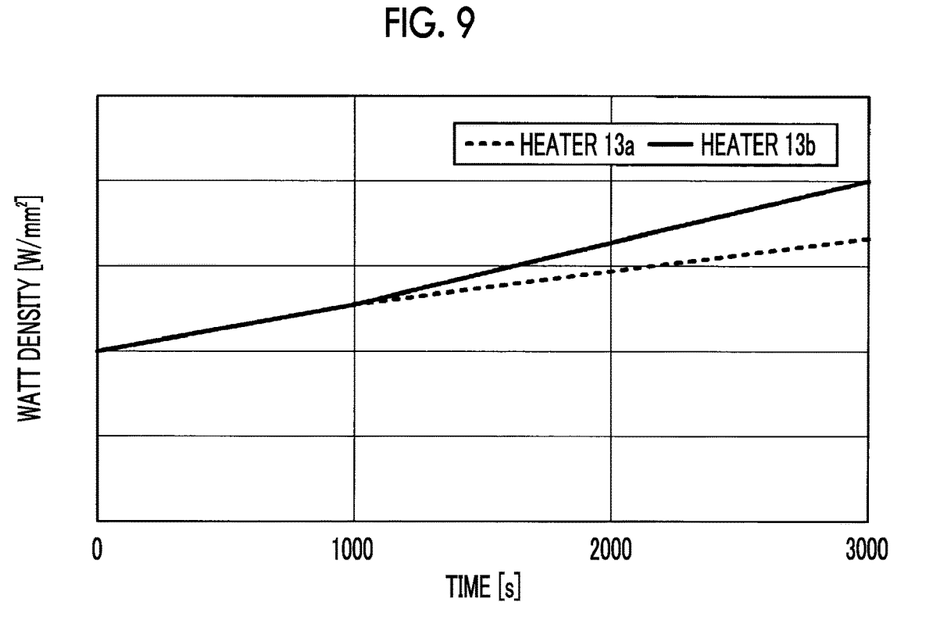
FIG. 9 is a graph of an example relating to the heating amount history of the heating heater.
Figure 10:
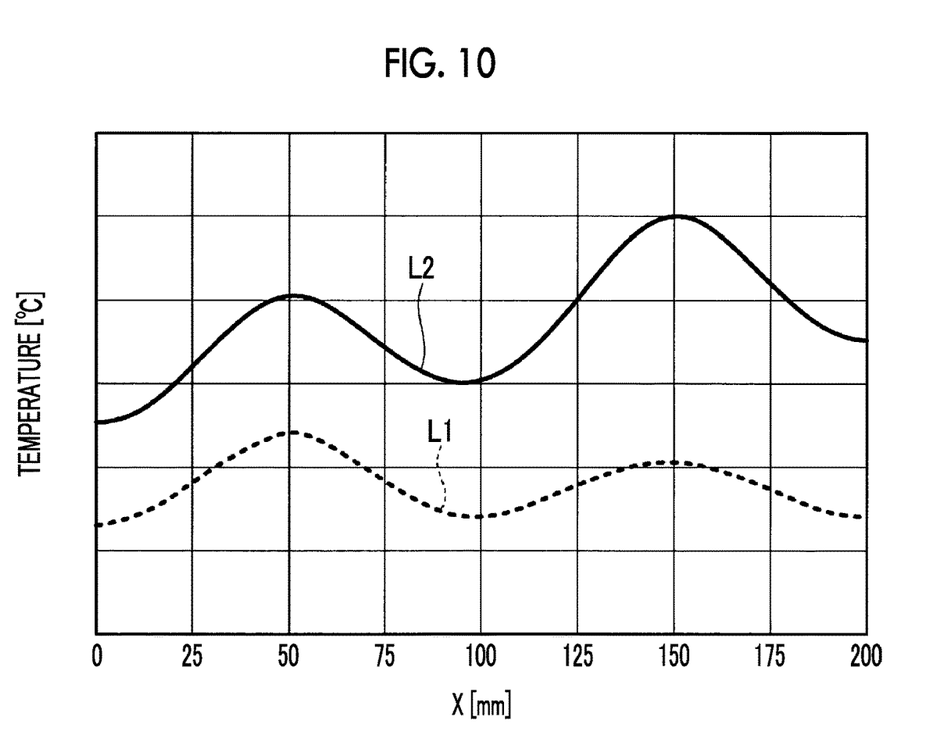
FIG. 10 is a graph relating to an example of the temperature changes of the molding apparatus and the composite material.

FIG. 9 is a graph of an example relating to the heating amount history of the heating heater and FIG. 10 is a graph relating to an example of the temperature changes of the molding apparatus and the composite material. As shown in FIG. 9, in a case where the control device 15 controls the heating unit 13A, specifically, in a case where the heating amounts (watt density) applied to the heating heater 13a and the heating heater 13b increase at the same fixed rate from the start time (0 s) to 1000 s such that the temperature of the heating heater 13b on the right side is higher than the temperature of the heating heater 13a on the left side and an increase rate of the heating amount (watt density) applied to the heating heater 13b is larger than that of the heating heater 13a from 1000 s to 3000 s, the temperatures of the line L1 and the line L2 are changed as shown in FIG. 10. In addition, FIG. 10 shows the line L1 and the line L2 at the predetermined time (3000 s). As shown in FIG. 10, in the line L1, the temperature difference between a portion where the thickness of the part W is thin and a portion where the thickness of the part W is thick is smaller than that of the FIG. 8.

Figure 11:
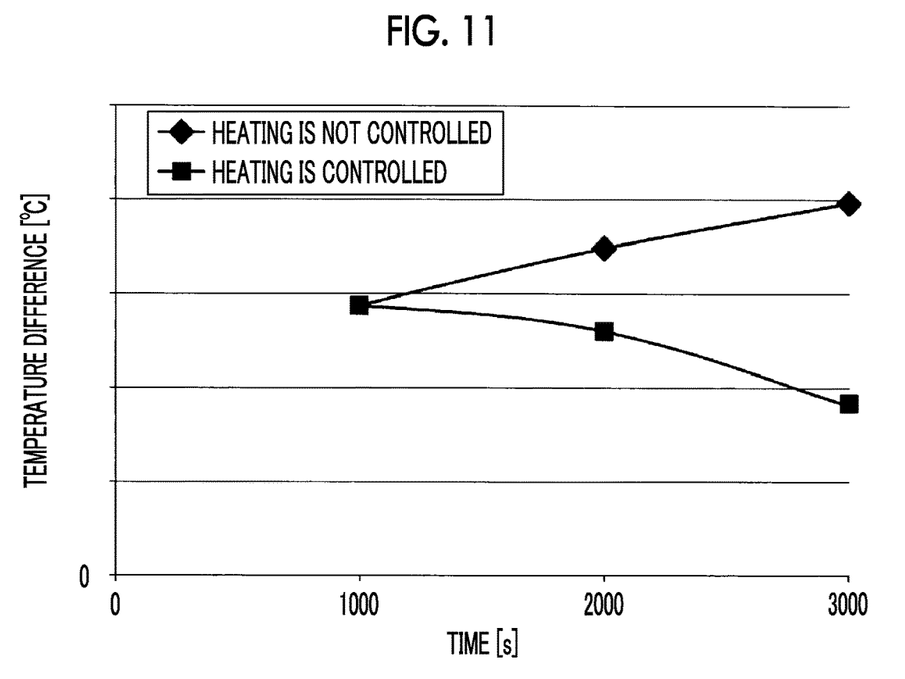
FIG. 11 is a graph relating to a change in temperature differences depending on whether or not the heating unit is controlled.
Figure 12:
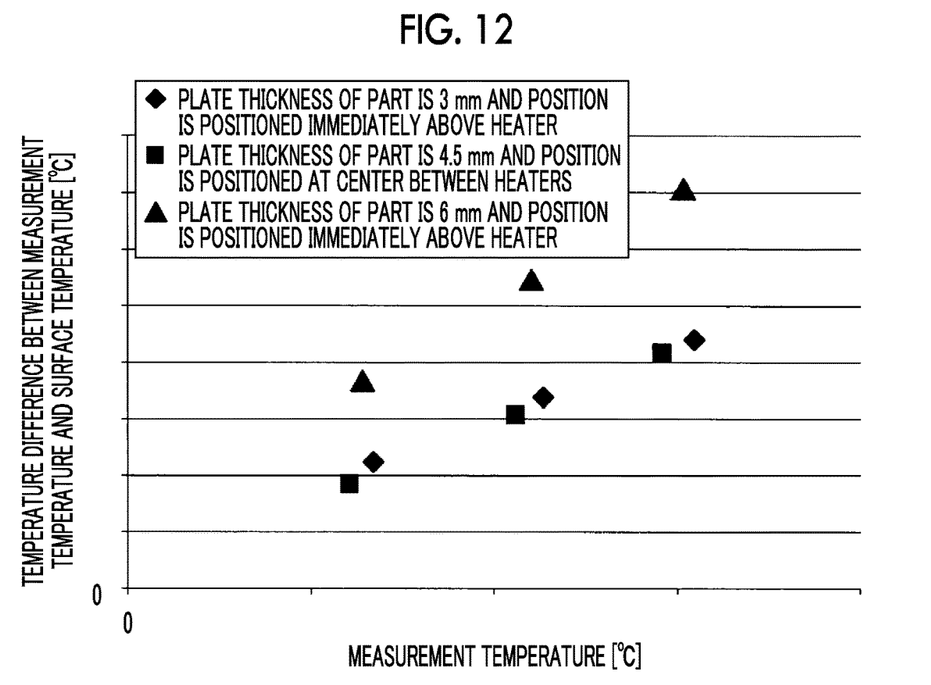
FIG. 12 is a graph relating to a change in temperature differences of the optical fiber temperature sensor and a surface of the composite material.

FIG. 11 is a graph relating to a change in temperature differences depending on whether or not the heating unit is controlled. As shown in FIG. 11, in a case where the control device 15 does not control the heating unit 13A (♦: heating is not controlled), the temperature difference in the line L1 increases according to the elapse of the time. Meanwhile, as shown in FIG. 12, in a case where the control device 15 controls the heating unit 13A (■: heating is controlled), the temperature difference in the line L1 decreases according to the elapse of the time. As described above, the control device 15 controls the heating unit 13A, and thus, it is confirmed by the analysis that the temperature distribution of the part W is uniform.

In addition, FIG. 12 is a graph relating to a change in temperature differences of the optical fiber temperature sensor and the surface of the composite material. FIG. 12 is a graph corresponding to the above-described data 63 relating to thermal response. As shown in FIG. 12, the temperature difference between the measurement temperature measured by the optical fiber temperature sensor 14 and the surface temperature (L1) of the part W is changed according to the positions of the heating heaters 13a and 13b and a plate thickness of the part W. For example, in a case where the plate thickness of the part W is 3 mm and the position is positioned immediately above the heating heater 13a (♦), the temperature difference is small and increases as the measurement temperature increases. In addition, for example, in a case where the plate thickness of the part W is 4.5 mm and the position is positioned at the center between the heating heater 13a and the heating heater 13b (♦), the temperature difference is small and increases as the measurement temperature increases. Moreover, for example, in a case where the plate thickness of the part W is 6 mm and the position is positioned immediately above the heating heater 13b (▲), the temperature difference is larger than the temperature difference in the case where the plate thickness is 3 mm or 4.5 mm, and the temperature difference increases as the measurement temperature increases. The control unit 51 controls the heating unit 13 based on the above-described thermal response, and thus, it is possible to adjust the temperature such that the actual temperature of the part W becomes the target molding temperature.

Next, the composite-material molding method will be described with reference to FIG. 4. This molding method is a method relating to the control operation of the heating unit 13 performed by the control device 15 during the molding of the composite material.

First, the composite material before curing is installed on the molding surface 12a of the molding apparatus 1, and the composite material before the curing and the molding apparatus 1 are accommodated in an autoclave. The composite material is heated under a high temperature and a high pressure in the autoclave and is heated by the heating unit 13 of the molding apparatus 1. In this state, the control device 15 acquires the measurement temperature measured by the optical fiber temperature sensor 14 (Step S1: measurement temperature acquisition step).

If the control device 15 acquires the measurement temperature, the control device 15 calculates the actual temperature of the composite material from the data 62 relating to the correlation, based on the measurement temperature (Step S2: actual temperature acquisition step). Continuously, the control device 15 acquires the target molding temperature of the composite material based on the data 61 relating to the target molding temperature from the storage unit 52 (Step S3: target molding temperature acquisition step). In addition, the control device 15 calculates the temperature difference between the acquired target molding temperature and the calculated actual temperature (Step S4: temperature difference calculation step).

Next, the control device 15 calculates the heat input amount to the composite material corresponding to the temperature difference such that the calculated temperature difference decreases, and based on the heat input amount to the composite material, the control device 15 calculates the heating amount of the heating unit 13 from the data 63 relating to thermal response stored in the storage unit 52 and controls the heating unit 13 such that the temperature of the heating unit reaches the calculated heating amount (Step S5: heating control step). In addition, by repeating Steps S1 to S5 described above, the control operation of the heating unit 13 is performed by the control device 15 such that the actual temperature of the composite material becomes the target molding temperature.

In addition, the target molding temperature acquisition step S3 is performed after the actual temperature acquisition step S2. However, the target molding temperature acquisition step S3 may be performed before the actual temperature acquisition step S2.

As described above, according to Embodiment 1, it is possible to measure the temperature of the composite material installed on the molding surface 12a by the optical fiber temperature sensor 14 without embedding the optical fiber temperature sensor 14 inside the composite material. Accordingly, whether or not the composite material reaches the target molding temperature which is a target temperature can be evaluated based on the measurement temperature measured by the optical fiber temperature sensor 14. Therefore, it is possible to measure the temperature of the composite material without decreasing strength of the composite material, and thus, it is possible to appropriately evaluate the composite material and it is possible to obtain the composite material which is appropriately molded.

According to Embodiment 1, the heating unit 13 is controlled by the control device 15, and thus, the molding surface 12a can be set to the temperature which is appropriate for molding the composite material. In this case, the temperatures of the plurality of heating regions E1 to E4 of the molding surface 12a can be controlled, and thus, it is possible to control the temperature of the molding surface 12a in detail, and a detailed temperature suitable for molding the composite material can be set. Therefore, it is possible to suppress occurrence of defects caused by the failure to reach the appropriate molding temperature of the composite material, and it is possible to improve productivity of the composite material.

In addition, according to Embodiment 1, based on the correlation, the thermal response, and the target molding temperature, it is possible to control the heating unit 13 by the control device 15 such that the actual temperature of the composite material becomes the target molding temperature.

In addition, according to Embodiment 1, the surface layer of the molding apparatus 1 is the composite-material layer 12, and thus, it is possible to decrease a weight of the molding apparatus 1, it is possible to decrease a heat capacity of the molding apparatus 1, and it is possible to effectively heat the composite material.

Moreover, according to Embodiment 1, the main body portion 11 includes carbon foams 25 and 26, and thus, it is possible to decrease the weight of the molding apparatus 1, it is possible to decrease the heat capacity of the molding apparatus 1, and it is possible to effectively heat the composite material.

In addition, according to Embodiment 1, the surface layer of the molding apparatus 1 is the composite-material layer 12. However, the present invention is not limited to this, and for example, the surface layer of the molding apparatus 1 may be a metal layer using a metal such as Invar.

Embodiment 2

Figure 5:
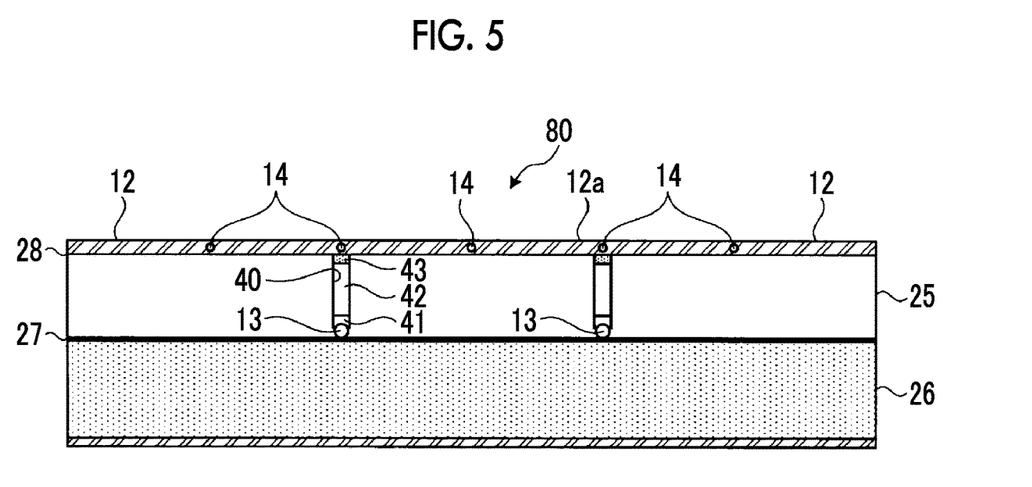
FIG. 5 is a sectional view schematically showing a composite-material molding apparatus according to Embodiment 2.

Next, a molding apparatus 80 according to Embodiment 2 will be described with reference to FIG. 5. In addition, in Embodiment 2, in order to avoid overlapping descriptions, portions different from those of Embodiment 1 are described, the same reference numerals are assigned to configurations which are substantially similar to those of Embodiment 1, and descriptions thereof are omitted. FIG. 5 is a sectional view schematically showing the composite-material molding apparatus according to Embodiment 2.

In the molding apparatus 80 of Embodiment 2, a portion of the optical fiber temperature sensor 14 is provided at a position which reaches the highest temperature in the molding surface 12a, and the other portion of the optical fiber temperature sensor 14 is provided at a position which reaches the lowest temperature in the molding surface 12a.

Specifically, as shown in FIG. 5, the position which reaches the highest temperature in the molding surface 12a is a position which is positioned immediately above each of the heating heaters 31 to 34 of the heating unit 13. Accordingly, a portion of the optical fiber temperature sensor 14 is provided to be positioned immediately above each of the heating heaters 31 to 34. In addition, for example, the position which reaches the lowest temperature in the molding surface 12a is an intermediate position between the heating heaters 31 to 34. Accordingly, the other portion of the optical fiber temperature sensor 14 is provided to be positioned at the intermediate position between the heating heaters 31 to 34. In addition, in a case where an end portion of the molding surface 12a reaches the lowest temperature, the other portion of the optical fiber temperature sensor 14 may be provided to be positioned at the end portion of the molding surface 12a.

As described above, according to Embodiment 2, it is possible to measure the highest temperature and the lowest temperature in the molding surface 12a by the optical fiber temperature sensor 14, and thus, it is possible to estimate a temperature distribution between the highest temperature and the lowest temperature, and it is possible to estimate a temperature distribution of the entire molding surface 12a.

REFERENCE SIGNS LIST

1: molding apparatus
11: main body portion
12: composite-material layer
12a: molding surface
13: heating unit
14: optical fiber temperature sensor
15: control device
25: front surface-side carbon foam
26: rear surface-side carbon foam
27: adhesive layer
28: adhesive layer
31: first heating heater
32: second heating heater
33: third heating heater
34: fourth heating heater
40: groove
41: heat transfer cement
42: carbon foam member
43: adhesive agent
51: control unit 52: storage unit
61: data relating to target molding temperature
62: data relating to correlation
63: data relating to thermal response
80: molding apparatus (Embodiment 2)
E1 to E4: heating region

The invention claimed is:

1. A composite-material molding apparatus for molding a composite material, the composite-material molding apparatus comprising:
 a main body portion;
 a fiber-reinforced composite material surface layer which covers across a surface of the main body portion and on which a molding surface for molding the composite material is formed opposite to the main body portion;
 a filamentous optical fiber temperature sensor which is embedded in the surface layer;
 a heating unit which is provided inside the main body portion; and
 a control device which controls the heating unit based on a temperature measured by the optical fiber temperature sensor,
 wherein the optical fiber temperature sensor is disposed in a planar manner in a plane parallel to the molding surface,
 wherein the control device stores a correlation between an actual temperature of the composite material being molded and a measurement temperature as measured at predetermined locations of the composite material being molded by the optical fiber temperature sensor, a thermal response to the molding surface with respect to the heating amount of the heating unit, and a target molding temperature of the composite material being molded in advance, and
 wherein the control device calculates the actual temperature at the predetermined locations of the composite material being molded from the correlation based on the measurement temperature measured by the optical fiber temperature sensor, calculates a temperature difference between the calculated actual temperature of the composite material being molded and the target molding temperature, and controls the heating unit based on the thermal response such that the temperature difference decreases.

2. The composite-material molding apparatus according to claim 1,
 wherein the heating unit is able to heat each of a plurality of heating regions set on the molding surface, and
 wherein the control device controls a heating amount generated by the heating unit in the plurality of heating regions.

3. The composite-material molding apparatus according to claim 1,
 wherein one portion of the optical fiber temperature sensor is provided at a position which reaches the highest temperature in the molding surface during use of the apparatus for said molding, and wherein a second portion of the optical fiber temperature sensor is provided at a position which reaches the lowest temperature in the molding surface during use of the apparatus for said molding.

4. The composite-material molding apparatus according to claim 1,
 wherein a thickness of the surface layer is approximately 3 mm to 5 mm, and wherein the optical fiber temperature sensor is disposed at a depth of approximately 1 mm to 2 mm from the molding surface.

5. The composite-material molding apparatus according to claim 1,
 wherein the main body portion includes a carbon foam.

6. The composite-material molding apparatus according to claim 1, wherein the optical fiber temperature sensor is disposed in a meandering manner with a spiral or lattice disposition within the surface layer.

7. The composite-material molding apparatus according to claim 1, wherein regions of the optical fiber temperature sensor are disposed immediately above and centered between heaters of the heating unit.

8. A composite-material molding method of molding a composite material using the composite-material molding apparatus according to claim 1, the method comprising:
 a measurement temperature acquisition step of acquiring the measurement temperature measured by the optical fiber temperature sensor embedded in the surface layer;
 an actual temperature acquisition step of using the control device to acquire the actual temperature of the composite material at the predetermined locations based on the correlation between the actual temperature of the composite material being molded and the measurement temperature as measured at the predetermined locations by the optical fiber temperature sensor;
 a target molding temperature acquisition step of using the control device to acquire the target molding temperature of the composite material being molded;
 a difference calculation step of using the control device to calculate the temperature difference between the target molding temperature and the actual temperature; and
 a heating control step of using the control device to control a heating amount to the composite material such that the temperature difference decreases.

* * * * *